INVENTORS
THOMAS S. COOPER
DAVID E. NORTON
BY John C. Black
ATTORNEY

DRIVE SYSTEM FOR A MAGNETIC CORE ARRAY

United States Patent Office 3,445,831
Patented May 20, 1969

3,445,831
DRIVE SYSTEM FOR A MAGNETIC CORE ARRAY

Thomas S. Cooper, Endicott, and David E. Norton, Poughkeepsie, N.Y., assignors to International Business Machines Corporation, Armonk, N.Y., a corporation of New York Filed Oct. 5, 1965, Ser. No. 493,102
Int. Cl. G11b 5/48
U.S. Cl. 340—174 15 Claims

ABSTRACT OF THE DISCLOSURE

In a direct drive system for a magnetic core array, transformer secondary windings connected to opposite ends of respective series drive line-switch circuits provide the sole source of energizing current for switching the cores. Floating, nonsaturating switches are characterized by base overdrive for fast turn-on and by turn-on and turn-off only while power is not applied to minimize power consumption.

Figure 1:
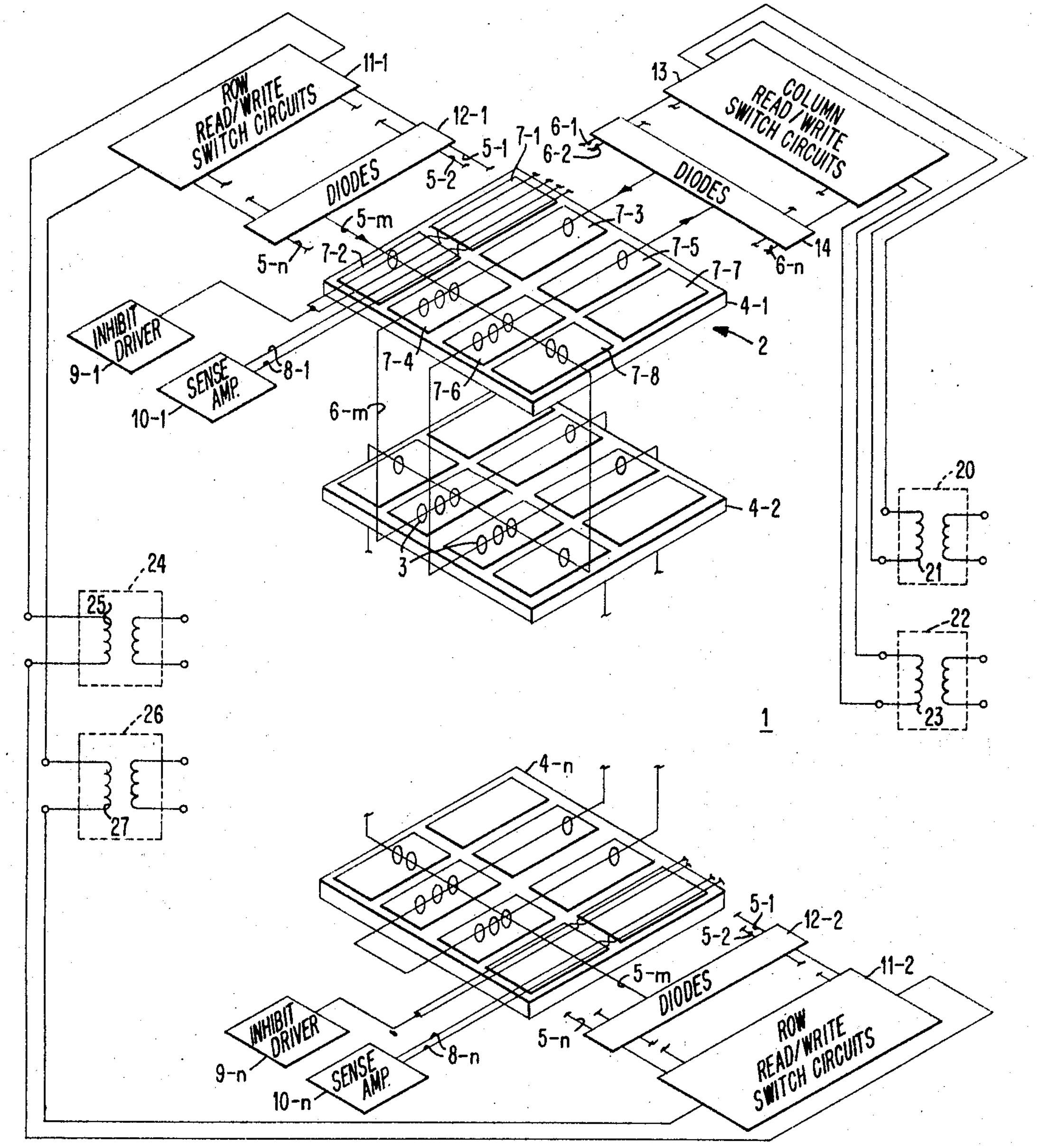

This application relates generally to an improved drive system for a magnetic core array.

In the past many different core array drive schemes have been proposed, one of which is frequently referred to as a "direct drive system." One form of the direct drive system is illustrated in U.S. Patent No. 3,192,510, issued June 29, 1965 to R. J. Flaherty, entitled Gated Diode Selection Drive System.

In a typical array, cores which exhibit a square loop hysteresis characteristic are arranged in rows and columns; and drive means associated therewith address selected groups of the cores in the array. Each row and each column of cores has a drive line to which bipolar read and write currents are applied. A source of read and write currents is selectively applied to the drive lines by way of switches to set the cores to one or the other of two stable states upon the coincident read or write energization of row and column drive lines common to the cores.

In data processing apparatus using magnetic cores as storage, transistors are typically used as the switches for selectively applying the energizing currents to the drive lines. This type of direct drive system has been found to be one of the most economical designs for main storage sections of data processing apparatus. In these storage devices, inhibit drive lines are used in conjunction with the row and column drive lines described above for selective energization of each core in a predetermined group of cores associated with a pair of row and column drive lines during the WRITE cycle.

Space and packaging considerations in the design of core arrays necessitate the further arrangement of the cores in a three dimensional array. That is, the cores are first arranged in a plurality of vertically spaced parallel planes, each plane having the cores further arranged in said rows and columns as described above. Unfortunately, this three dimensional arrangement of the cores gives rise to much more serious noise problems in the sense lines associated with the array than arises with the use of a two dimensional array. In a two dimensional array, the cores can be arranged in a single plane and a ground plane can be placed immediately adjacent each and every one of the cores. This two dimensional array with the adjacent ground plane minimizes the array capacitance and noise problems associated with this capacitance. However, it is exceedingly difficult to provide a completely suitable ground plane arrangement with a three dimensional array; and, in addition, the stray capacitance associated with the three dimensional array is greater than that of a two dimensional array.

Consequently, in the storage devices of data processing apparatus, severe noise problems are encountered. The direct drive system indicated above is an extremely economical design; but previous known designs have not been as reliable as is the more expensive, load-sharing core matrix drive systems. The decreased reliability of the direct drive systems has been due primarily to the existence of the significant stray capacitances in the three dimensional as well as two dimensional core arrays together with the ground feedback paths through the sense lines and sense amplifiers of the array for noise which is produced by the drive system itself.

In the earlier direct drive systems the power supply has, so far as is known, been in the form of one or more direct current power supplies. A modification introduced into the earlier direct drive systems to minimize noise and thereby improve reliability was the use of two completely separate direct current power supplies of equal and opposite potentials connected to opposite ends of the drive lines and their associated transistor switches to "balance" the array around ground. For a perfectly "balanced" drive, the current into one side of the array is identical to that out of the other side. This means that the drive causes no net current in the sense windings. This use of two supplies did somewhat improve the reliability and decrease the noise problems. However, it is not completely satisfactory because a complete balancing effect is not achieved. The array impedances, timing skews and the power supplies give rise to imbalance.

At least a part of the noise problem can be minimized by decreasing the rise and fall times of the drive current pulses. However, in order to decrease said rise and fall times, it would be normally necessary to increase the potential levels of the power supplies. This gives rise to serious transistor breakdown problems. There are maximum potential limits which can be applied in a practical system because unduly high potentials require the use of expensive transistor switches which can tolerate such high voltages without breakdown. Keeping in mind that the number of switches in any large storage device is extremely high, it can be appreciated that a practical storage system cannot utilize expensive transistor switches.

One proposed improvement in the reliability of the direct drive system is that set forth in U.S. patent application Ser. No. 493,112, Docket 6629, filed Oct. 5, 1965 by Gerald K. Strehl and assigned to the assignee of the present application. In said Strehl application, a pulse transformer is included between the direct current power supply and the transistor switches in order to provide a pulse of very short duration which is of the same polarity as the direct current supply. This pulse momentarily increases the applied voltage to cause the drive currents to rise more rapidly. This arrangement significantly improves the operation of the storage device; however, it still does not provide an operational characteristic which is as reliable as and as noise free as the above said core matrix drive system.

Accordingly, it is the primary object of the present invention to provide an improved direct drive system which is much more noise free and reliable than previous systems.

This object is provided in a preferred embodiment of the present invention by completely eliminating the direct connection of direct current supply potentials to the drive line circuits. Instead, the secondary windings of power supply transformers provide the sole source of energizing current for the drive line; and this current is connected to the drive lines by the series connected transistor switches of the direct drive system. The supply transformers are selected so as to provide a fast current rise time the only limitation being that the cost of the transformers be compatible with the over-all cost which can be provided in a storage device of this type.

Accordingly, it is a more specific object of the invention to provide an improved direct drive system for a core array which is characterized by the secondary winding of one or more transformers being the sole source of energizing current for the drive lines and the transistor switches which are connected in series with said lines.

In the preferred embodiment of the present invention, each of the transistor switches is in the form of a floating nonsaturating switch on the type described and claimed in U.S. patent application of Edward H. Sommerfield, Ser. No. 269,370, filed Apr. 1, 1963 now Patent No. 3,289,008, issued Nov. 29, 1966 and assigned to the assignee of the present application. Said Sommerfield application is hereby incorporated herein by reference as if it were set forth in its entirety.

Briefly, this switch includes a coupling transformer as the sole source of energizing current for its base-emitter circuit. The transformer includes a primary winding, a secondary winding connected across the base-emitter electrodes and an additional secondary winding connected across the emitter-collector electrodes. A diode is connected in series with said additional winding.

During turn on of the transistor, the diode becomes forward biased as the transistor approaches saturation to maintain the voltage of said additional winding across the emitter collector electrodes, thereby inhibiting operation in the region of saturation. When the diode forward biases, the base current falls to a level which is a small fraction of its initial turn on level.

The switch therefore provides rapid turn on with an initial base current overdrive. It also is especially advantageous because its emitter electrode is "floating;" and turn on of the transistor is assured irrespective of the voltage level at the emitter electrode.

The combination of the transformers which forms the sole source of power for the drive currents in the array and the transformer coupled switches isolate the drive lines from the direct current power supplies. This minimizes the coupling of current from the drive lines to the sense lines because there is now no reference which is common to both the drive and sense lines. This arrangement, therefore, approaches the desired equalization of the drive currents into the array and the drive currents out of the array.

Accordingly, it is another important object of the present invention to provide an improved direct drive system of the type described characterized by floating, nonsaturating transistor switches associated with the drive lines.

In addition, the preferred embodiment of the present application is controlled so as to significantly improve the operation of the present core array together with affording many economic and speed advantages. Thus, in the preferred embodiment, the selected transistor switches are turned on to complete series circuits through their respective drive lines prior to the application of a square wave voltage pulse applied to the drive lines by the pulse (or power) transformers. The supply transformers apply their voltage pulses to the drive lines and transistor switch circuits a short time after the transistors turn on, for example 25 nanoseconds.

Thus, when the turn on pulses are applied to the base-emitter electrodes of the transistor switches, the transistors immediately enter a region of saturation since there is no collector supply potential. This provides many significant advantages. For example, there is now no transistor breakdown problem because the collector to emitter voltages are applied only after the transistors are turned on to their low impedance state.

The voltage pulse provided by the power supply transformer is removed a short time prior to the turning off of the transistor, for example 25 nanoseconds.

A second, and most important, advantage is the significant reduction in power consumption as a result of the turning on and turning off of the transistor switches with no collector to emitter operating potentials applied. It is well known that the most significant amounts of power are consumed by transistors when they are turned on and turned off under load. Since there is substantially no load on the transistors when they are turned on and off, this power consumption is now minimized. As a result, power dissipating heat sinks are not required; much smaller transistors can be used; and, because of the smaller interelectrode capacitance, the smaller transistors can assure a high turn on, turn off and operating speed. Also, only one regulated power supply rather than two separately regulated supplies is required.

The foregoing and other objects, features and advantages of the invention will be apparent from the following more particular description of a preferred embodiment of the invention, as illustrated in the accompanying drawings.

Figure 3:
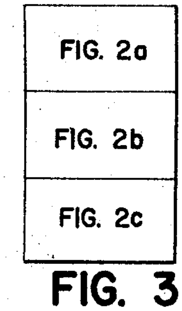
Figure 4:
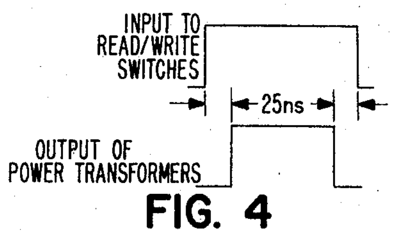
Figure 2A:
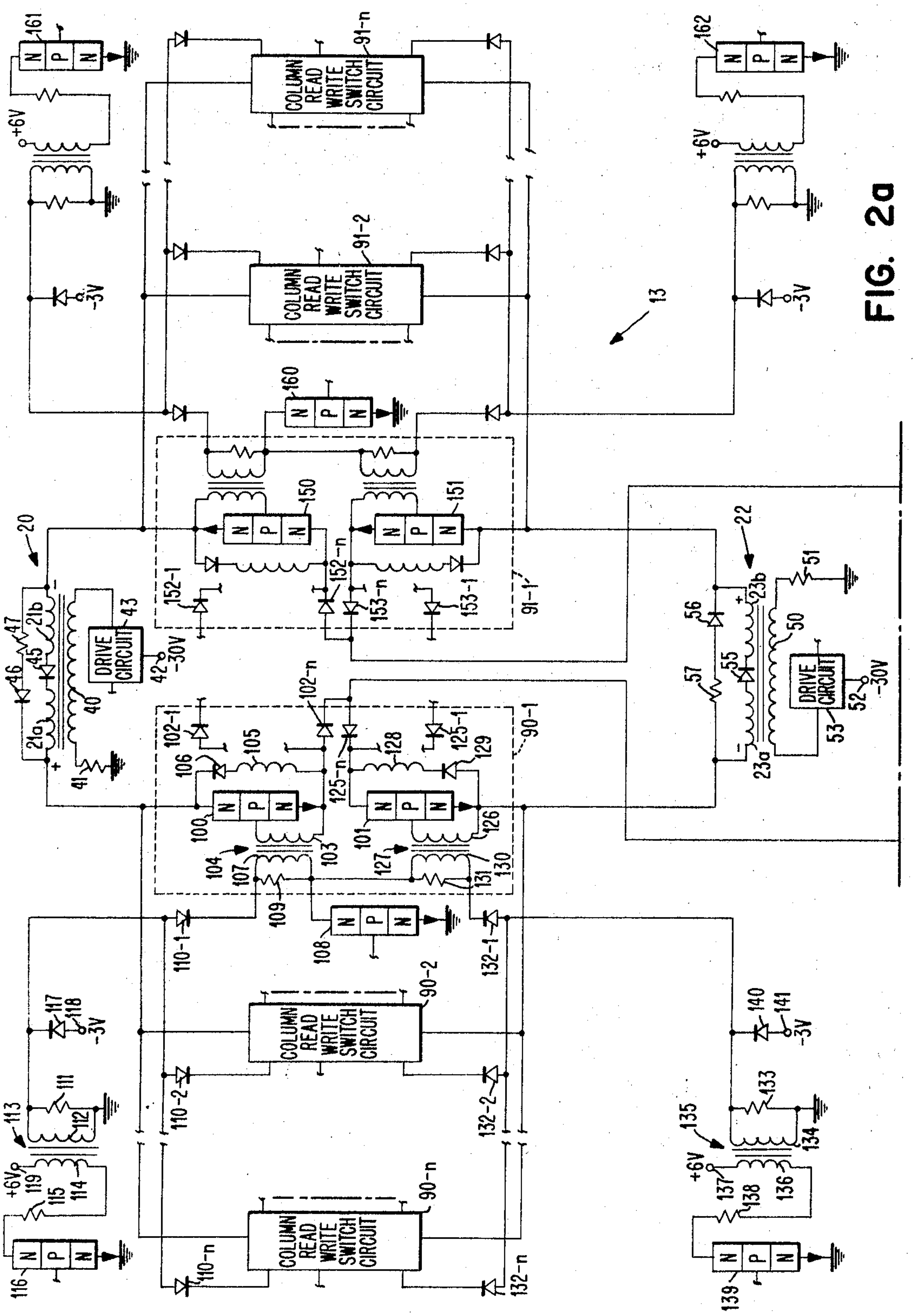
Figure 2B:
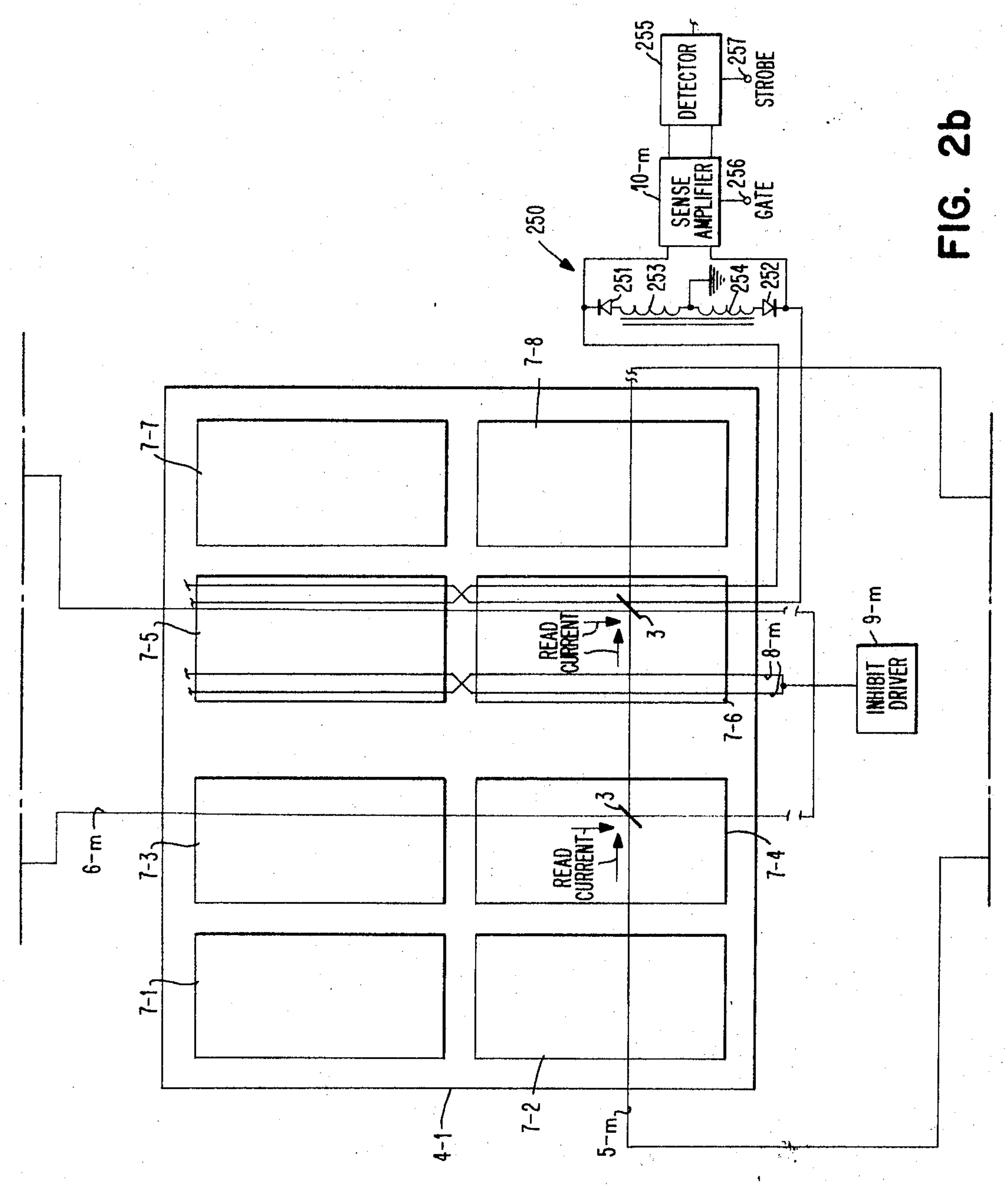
Figure 2C:
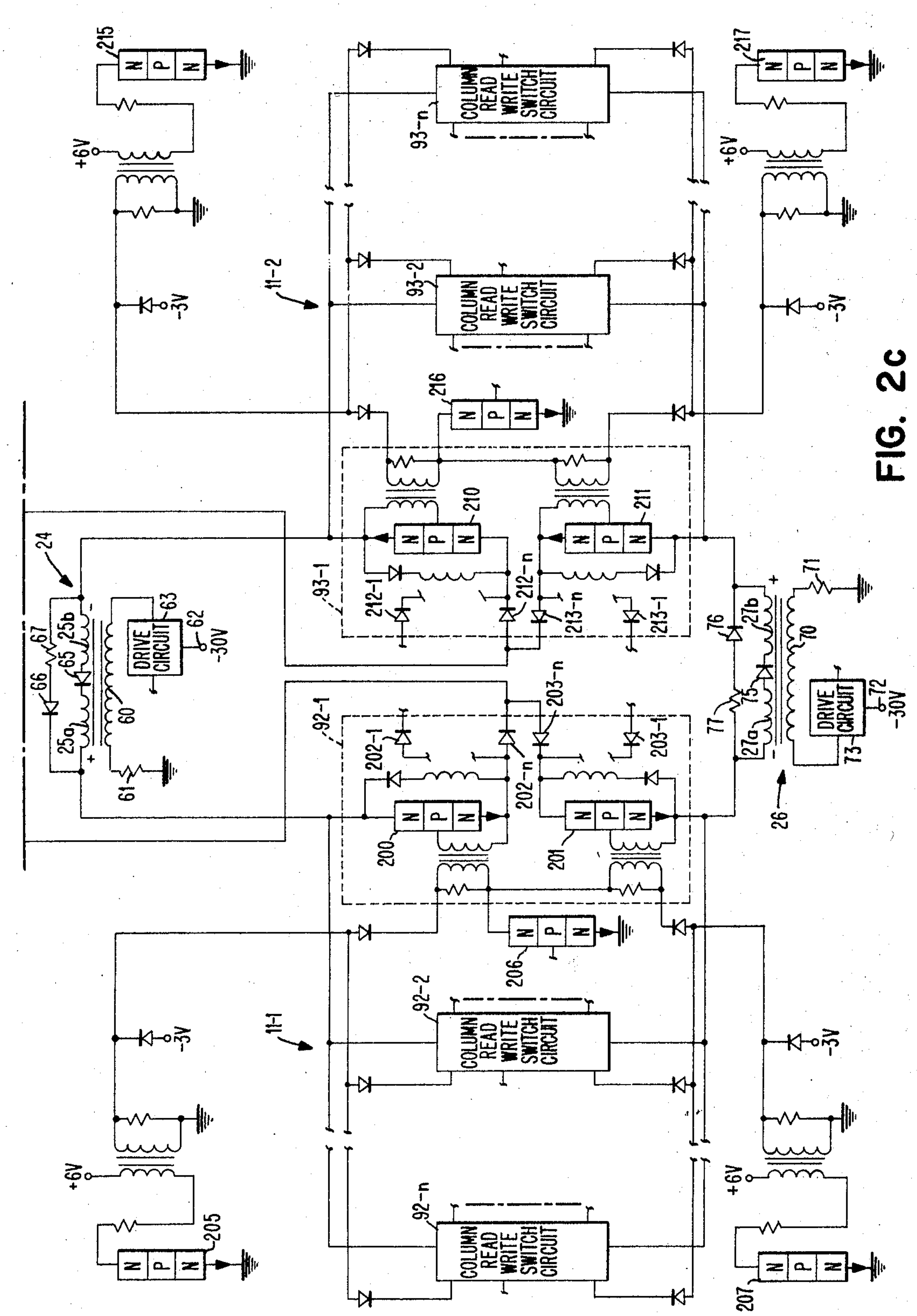

In the drawings:

FIG. 1 is a fragmentary isometric view of a three dimensional core array and a diagrammatic representation of the read and write switches, the inhibit drivers and the sense amplifiers of the improved drive system;

FIGS. 2*a*, 2*b* and 2*c* are fragmentary schematic diagrams illustrating the row and column switches of the improved drive system;

FIG. 3 illustrates the manner in which FIGS. 2*a*, 2*b* and 2*c* are connected together; and FIG. 4 shows wave forms illustrating the input signals applied to the read/write switches and to the power supply transformers.

The improved storage device 1, illustrated in FIG. 1, includes a core array 2 having a plurality of bistable ferrite cores 3 arranged in a plurality of vertically spaced planes 4–1 to **4–*n*** inclusive. The cores in each plane are further arranged in rows and columns.

A plurality of row drive lines 5–1 to **5–*n* are provided, each line (such as intermediate line 5–*m*) being threaded through a respective row of cores in each of the planes. A plurality of column drive lines 6–1 to 6–*n* are provided. The line 6–1** is threaded through the cores in a respective column in each of the planes in one direction and then through the cores in a respective column in each plane in the opposite direction. Each of the other column lines are also threaded through two respective columns of cores in each plane in order to achieve what is commonly called the "phase reversal" method of operation. This will be described in more detail below.

In each plane, the cores are further arranged in eight groups, e.g. 7–1 to 7–8. A line 8–1 is threaded through each of the cores in the groups 7–1 and 7–2 and is connected to an inhibit driver 9–1 and a sense amplifier 10–1 to perform both an inhibit and a sense function. Similar inhibit drivers and sense amplifiers (not shown) together with a common line similar to 8 are provided for each of the pairs of core groups 7–3, 7–4; 7–5, 7–6 and 7–7, 7–8. Thus each plane has associated with it four inhibit drivers, four sense amplifiers and their respective four common lines. Also, each of the planes 4–2 to **4–*n* have a respective set of four inhibit drivers and four sense amplifiers (not shown, except for driver 9–*n* and amplifier 10–*n***).

A first group of row read/write switches 11–1 and a second group of row read/write switches 11–2 are connected to the row drive lines 5–1 to **5–*n* by diode matrices 12–1 and 12–2. A group of column read/write switches 13 is connected to the column drive lines 6–1 to 6–*n* by way of a diode matrix 14**.

A first power transformer 20 has its secondary winding connected to the column switches 13. A second power transformer 22 has is secondary winding 23 connected to the column switches 13 and together with the transformer 20 provides the sole source of read and write energizing current for the column drive lines 6–1 to **6–*n***.

A power transformer 24 has its secondary winding 25 connected to the row switches 11–1 and 11–2. Similarly, a power transformer 26 has its secondary winding 27 connected to the row switches 11–1 and 11–2 and with the transformer 24 provides the sole source of read and write energizing current for the row drive lines 5–1 to **5–*n*** inclusive.

The fragmentary, schematic diagram of FIGS. 2*a*, 2*b* and 2*c* show the preferred forms of the tranformers 20, 22, 24 and 26, and the details of one of the read/write switches in each group 11–1 and 11–2, the details of two of the read/write switches in the group 13, and the row and column drive lines **5–*m* and 6–*m* which are selected by the abovesaid switches, an inhibit driver 9–*n*, a sense amplifier 10–*n* and the line 8–*n*** which is common to the inhibit driver and sense amplifier, and certain of the switch selection circuits.

In the preferred embodiment, the transformer 20 includes a primary winding 40 having one terminal thereof connected to ground potential by way of a resistor 41 and the other terminal thereof connected to a negative supply terminal 42 by way of a drive circuit 43. The secondary of the transformer 20 preferably includes a pair of series windings **21*a* and 21*b* connected together by a diode 45. A series connection diode 46 and a resistor 47 are connected across the remote terminals of the secondary winding 21*a* and 21*b***.

Each of the transformers 20, 22, 24 and 26 is preferably constructed in a similar manner. Thus the transformer 22 includes a primary winding 50 connected to ground potential by way of a resistor 51 and to a negative supply terminal 52 by way of a drive circuit 53. The transformer 22 further includes secondary windings **23*a* and 23*b* connected together by a diode 55. A diode 56 and a resistor 57** are connected across the secondary winding.

The transformer 24 includes a primary winding 60 connected to ground potential by a resistor 61 and to a negative supply terminal 62 by way of a drive circuit 63. The transformer includes secondary windings **25*a* and 25*b* connected together by a diode 65. A diode 66 and a resistor 67** are connected across the secondary windings.

The transformer 26 includes a primary winding 70 connected to ground potential by a resistor 71 and to a negative supply terminal 72 by way of a drive circuit 73. The transformer includes secondary windings **27*a* and 27*b* connected together by a diode 75. A diode 76 and a resistor 77** are connected across the secondary windings.

One terminal of the secondary winding **21*a* of the transformer 20 is connected to each of the column read/write switch circuits 90–1 to 90–*n* of the group 13. One of the terminals of the secondary winding 21*b* is connected to each of the column read/write switch circuits 91–1 to 91–*n* of the group 13**.

Similarly, one terminal of the secondary winding **23*a* of the transformer 22 is connected to each of the circuits 90–1 to 90–*n*; and one of the terminals of the secondary winding 23*b* is connected to each of the circuits 91–1 to 91–*n***.

One terminal of the secondary winding **25*a* of the transformer 24 is connected to each of the row read/write switch circuits 92–1 to 92–*n* of the group 11–1; and one of the terminals of the secondary winding 25*b* is connected to each of the row read/write switch circuits 93–1 to 93–*n***.

One of the terminals of secondary winding **27*a* of the transformer 26 is connected to each of the circuits 92–1 to 92–*n*; and one of the terminals of the secondary winding 27*b* is connected to each of the circuits 93–1 to 93–*n***.

The transformers 20 and 22, therefore, provide the power for the read and write currents for the column drive lines; and the transformers 24 and 26 provide the power for the read and write currents for the row drive lines.

The read/write switch circuit 90–1 includes a pair of transistor switches 100 and 101 preferably of the type described in the above said Sommerfield application. The transistor 100 has its collector electrode connected to the secondary winding **21*a* and its emitter electrode connected to column drive line 6–*m* by way of a diode 102–*n* of a group of diodes 102–1 to 102–*n*, each of which is connected to a respective column drive line. The secondary winding 103 of a transformer 104 is connected across the base-emitter electrodes of the transistor 100. An additional secondary winding 105 and a diode 106 are connected across the emitter-collector electrodes of the transistor 100**.

The transformer 104 includes a primary winding 107 having one terminal thereof connected to ground potential by way of a transistor gate 108. A resistor 109 is connected in shunt with the primary winding 107. The other terminal of the winding 107 is connected to ground potential by way of a diode 110–1 and a resistor 111. The secondary winding 112 of a transformer 113 is connected across the resistor 111. The transformer 113 includes a primary winding 114 connected to a positive supply terminal 119 and to ground potential by way of a resistor 115 and a transistor driver 116. A diode 117 connects the junction between the diode 110–1 and the resistor 111 to a negative supply terminal 118 to limit the negative potential swings in the winding 112. Energization of the gate 108 and the driver 116 produces a pulse in the primary winding 107 and energizes the driver switch 100 to its low impedance state.

The transistor switch 101 has its emitter electrode connected to one terminal of the secondary winding **23*a* of the transformer 22 and has its collector electrode connected to the column drive line 6–*m* by way of a diode 125–*n* of a group of diodes 125–1 to 125–*n*, each of which is connected to a respective one of the drive lines associated with the diodes 102–1 to 102–*n*. The secondary winding 126 of a transformer 127 is connected across the base-emitter electrodes of the transistor 101. An additional secondary winding 128 of the transformers 127 and a diode 129 are connected across the emitter-collector electrodes of the switch 101. The transformer 127 includes a primary winding 130 and this winding and its shunt resistor 131 are connected to ground potential by way of the gate 108. The primary winding 130 and its shunt resistor 131 are also connected to ground potential by way of a diode 132–1 and a resistor 133. The secondary winding 134 of a transformer 135 is connected across the resistor 133. The transformer 135 includes a primary winding 136 having one terminal connected to a positive supply terminal 137 and its other terminal connected to ground potential by way of a resistor 138 and a transistor driver 139. A clamp diode 140 connects the junction between the resistor 133 and the diode 132–1 to a negative supply terminal 141**.

Coincident energization of the gate 108 and the driver 139 energize the transistor switch 101. The transistor drivers 116 and 139, together with their associated circuits, their common selection switch 108 and similar common selection switches (not shown) associated with the other drivers 90–2 to **90–*n*, and diodes 110–1 to 110–*n* and 132–1 to 132–*n*, control the selection of the switch circuits 90–1 to 90–*n***.

Preferably each of the drivers 90–1 to **90–*n*** is constructed in an identical manner.

Each of the switch circuits 91–1 to **91–*n* is similar to the circuit 90–1. The circuit 91–1** will, therefore, be described only briefly.

The driver 91–1 includes a pair of transistor driver switches 150 and 151 connected to the opposite end of the column drive line **6–*m* by means of diodes 152–*n* and 153–*n*. The driver 150 is connected to a respective group of column drive lines (not shown, except for line 6–*m*) by means of the group of diodes 152–1 to 152–*n*; and the driver 151 is connected to these drive lines by means of a group of diodes 153–1 to 153–*n*. Energization of the driver 150 is effected by the coincident energization of a transistor gate 160 and a transistor driver 161. Energization of the driver 151 is effected by the coincident energization of the gate 160 and a transistor driver 162**.

The drivers 161 and 162 and gates (not shown) similar to gate 160 and associated with respective ones of the circuits 91–2 to **91–*n*** control the selection of said latter circuits.

The circuits 92–1 to **92–*n*, the circuits 93–1 to 93–*n*, and the means for selecting these switch circuits are preferably similar to those described with respect to the circuits 90–1 to 90–*n*. The row switch circuits 92–1 to 92–*n* and 93–1 to 93–*n*** will, therefore, be described only briefly.

The driver 92–1 includes transistor switches 200 and 201 which are connected to one end of the row drive line **5–*m* by means of diodes 202–*n* and 203–*n* respectively. The switches 200 and 201 are connected to a selected group of drive lines including the line 5–*m* by means of the respective groups of diodes 202–1 to 202–*n* and 203–1 to 203–*n*. Energization of the switch 200 is effected upon the coincident energization of a transistor driver 205 and a transistor gate 206. Energization of the switch 201 is effected upon the coincident energization of the transistor gate 206 and a transistor driver 207**.

The switch circuit 93–1 includes a pair of transistor switches 210 and 211 which are connected to the row drive line **5–*m* by way of diodes 212–*n* and 213–*n* respectively. These switches 210 and 211 are also connected to a respective group of row drive lines including the line 5–*m* by means of the diode groups 212–1 to 212–*n* and 213–1 to 213–*n***.

The energization of the switch 210 is controlled by the coincident energization of a transistor driver 215 and a transistor gate 216. The energization of the switch 211 is controlled by the coincident energization of the transistor gate 216 and a transistor driver 217.

The operation of the circuits of FIGS. 2*a*, 2*b* and 2*c* will be described with respect to applying read and write currents for entering data into the core 3 illustrated in FIG. 2*b* with respect to the group 7–6.

Addressing circuits (not shown) will cause the coincident energization of the driver 116 and the gate 108 to energize the base-emitter circuit of the transistor switch 100. At the same time the addressing circuits will cause the coincident energization of the driver 161 and the gate 160 to energize the base-emitter circuit of the switch 150. In the preferred embodiment, the transformer 20 has not as yet been driven when the switches 100 and 150 are turned on, and the latter switches turn on very rapidly since they are not under load. The switches assume their low impedance conditions completing a series circuit for the column drive line **6–*m*. This circuit extends from the secondary winding 21*a* through the switch 100, the diode 102–*n*, the column drive line 6–*m*, the diode 152–*n* and the transistor switch 150 to the secondary winding 21*b***.

Twenty-five nanoseconds after the switches 100 and 150 are turned on, a pulse is applied to the drive circuit 43 to produce a square wave pulse in the primary winding 40 of the transformer 20. This produces a square wave pulse in the secondary windings **21*a* and 21*b* which pulse is applied to the drive line 6–*m*** over the circuit described immediately above. This voltage pulse produces a half-select write current in the drive line.

At the same time that the driver 116 and the gate 108 are energized to turn on the transistor 100, the driver 207 and the gate 206 are energized to turn on the switch 201; and the driver 217 and the gate 216 are energized to turn on the transistor switch 211. The switches 201 and 211 assume their low impedance states and complete a circuit for the row drive line **5–*m* extending from the winding 27*b*, the switch 211, the diode 213–*n*, the line 5–*m*, the diode 203–*n* and the switch 201 to the winding 27*a***.

Twenty-five nanoseconds thereafter, a pulse is applied to the drive circuit 73 to produce a square wave pulse in the primary winding 70 of the transformer 26. This produces a square wave pulse in the secondary windings **27*a* and 27*b*. This latter pulse produces a half-select write current in the row drive line 5–*m***.

Assuming that it is desired to write a logical "1" data bit into the core 3 in the group 7–6, the inhibit driver **9–*m* is not energized at this time and the two half-select currents in the column and row drive lines 6–*m* and 5–*m* produce sufficient flux to switch the core 3 to its opposite stable state. In the event that it is desired to have a logical "0" data bit stored in the core 3, the inhibit driver 9–*m* is energized in such a manner as to produce in the line 8–*m* a current which is equal in magnitude and opposite in polarity to the column half-select current, thereby preventing the switching of the core 3**.

After a predetermined time interval, the drive circuits 73 and 43 are turned off to terminate the pulse in the secondary windings **27*a*, 27*b*, 21*a* and 21*b*. The diodes 75 and 45, which had been forward biased during the time interval when power pulse was applied to the secondary windings, now become reverse biased to permit the secondary windings to become open circuited and recover independent of the shunt paths through the resistor 77, diode 76 and resistor 47, diode 46. Upon the turning off of the primary winding energy, the diodes 46 and 76 forward bias to terminate the row and column drive lines 5–*m* and 6–*m* for the fall of current therein. The resistors 51 and 71** provide a termination for the rise and flat-top pulse of the current in the array.

A read cycle will now be described with respect to the core 3 in the group 7–6, it being assumed that the core has been set to its logical "1" state by the preceding write cycle.

The driver 139 and the gate 108 are energized to turn on the transistor switch 101 to its low impedance state and the driver 162 and the gate 160 are energized to turn on the transistor switch 151 to its low impedance state. This completes a circuit for the column drive line **6–*m* through the switches 101 and 151 and their diodes 125–*n* and 152–*n* to the secondary windings 23*a* and 23*b* of the transformer 22. At the same time, the driver 205 and the gate 206 are energized to turn on the transistor switch 200 to its low impedance state; and the driver 215 and its gate 216 are energized to turn on the transistor switch 210 to its low impedance state. The switches 200 and 210 complete a circuit including their diodes 202–*n* and 212–*n* connecting the row drive line 5–*m* to the secondary windings 25*a* and 25*b* of the transformer 24**.

Twenty-five nanoseconds after the switches 101, 151, 200 and 210 are turned on, pulses are applied to the drive circuits 53 and 63 to energize their primary windings 50 and 60. This produces a square wave voltage pulses in the secondary windings **23*a*, 23*b* and 25*a* and 25*b*. These pulses in the secondary windings produce half-select read currents in their respective drive lines. These read currents will switch the core 3 shown in group 7–6 to its initial stable state, thereby producing an output pulse in the sense line 8–*m*. This pulse is applied to the sense amplifier 10–*m* by way of a balanced input circuit 250 which includes a pair of diodes 251 and 252 and a pair of inductors 253 and 254 which connect the line 8–*m* to ground potential. The output of the sense amplifier is connected to a detector 255. In order to minimize the amount of noise and to provide improved discrimination with respect to data signals, the sense amplifier 10–*m* is controlled by a gate input 256 and the detector 255 is controlled by a strobe input 257**.

After a predetermined time interval, the energizing circuits for the transformers 24 and 22 are opened to terminate the voltage pulse in the secondary windings. As in the preceding write cycle, the diodes 55 and 65 associated with the secondary windings of the transformers will reverse bias to open the secondary windings permitting their recovery independent of the parallel connected resistors 57, 67 and diodes 56, 66. The diodes 56 and 66 forward bias upon the removal of the transformer energizing pulse to terminate their respective drive lines for the fall of current in the array.

The resistors 51 and 61 provide a termination for the rise and flat-top pulse of current in the array.

It will be appreciated that, in the event that the core 3 in the group 7–4 is addressed, the transformer 22 instead of the transformer 20 will provide the write column current and that the transformer 20 rather than 22 will produce the column read current. The read and write currents are the same for the cores in both groups 7–4 and 7–6 for row drive lines, such as 5–m.

It will be appreciated that the circuits illustrated have been shown merely by way of example and that various modifications may be made by those skilled in the art without departing from the teachings of the present application. For example, the switch arrangement for selecting drive lines can be substantially different, it merely being necessary that the switches, when energized, connect respective row and column drive lines to the transformer current sources. It will also be appreciated that one transformer rather than two can be provided for both the read and write currents of the column drive lines and another transformer for the read and write currents of the row drive lines. In this case, it is necessary to produce bipolar rather than unipolar pulses in the secondary windings of the transformers. It is also possible to use only one transformer for all drive lines. Again, as in the preceding case, this transformer must provide at its secondary windings bipolar pulses rather than unipolar pulses. However, if the number of transformers is reduced to one rather than the four shown, it will be appreciated that it will have to supply significantly greater power. In both cases, the switches for connecting the drive lines are preferably energized prior to the energization of the secondary windings of the transformers.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a magnetic core array of the type in which bistable cores are arranged in rows and columns;

in which means including row and column drive lines, threaded through respective rows and columns of cores, selectively address the cores; and in which means including electronic switch means are operated for selectively establishing series circuits through the switch means and drive lines for the application of bipolar read and write currents to the drive lines to enter binary data into and to read binary data from the cores;

the combination with the switch means and the drive lines of transformer means including primary winding means and secondary winding means, a direct current supply connected only to the primary winding means, the secondary winding means connected to opposite ends of the series circuits formed by the switch means and the row drive lines and by the switch means and the column drive lines and constituting the sole source of energizing current for said row and column drive lines.

2. The combination set forth in claim 1 wherein the electronic switch means includes a plurality of transistor switches connected to respective drive lines, each switch comprising a transistor including base and emitter electrodes; and an input transformer including a secondary winding connected across the base and emitter electrodes and providing the sole source of base-emitter energizing current.

3. The combination set forth in claim 1 wherein the electronic switch means includes a plurality of transistor switches connected to respective drive lines, each switch comprising a transistor including base, collector and emitter electrodes;

an input transformer including a secondary winding, connected across the base and emitter electrodes and providing the sole source of base-emitter energizing current, and including an additional secondary winding;

a diode and said additional winding being connected in series across the emitter and collector electrodes and effective to prevent operation of the transistor in saturation.

4. The combination set forth in claim 1 wherein the electronic switch means is energized to establish series circuits for the selected drive lines, and in which the transformer means is energized to initiate alternatively the read or write currents in the selected drive lines subsequent to the energization of the switch means and is de-energized prior to the de-energization of the switch means.

5. The combination set forth in claim 2 wherein the electronic switch means is energized to establish series circuits for the selected drive lines, and in which the transformer means is energized to initiate alternatively the read or write currents in the selected drive lines subsequent to the energization of the switch means and is de-energized prior to the de-energization of the switch means.

6. In a magnetic core array of the type in which bistable cores are arranged in rows and columns;

in which means including row and column drive lines, threaded through respective rows and columns of cores, selectively address the cores; and in which means including electronic switch means are operated for selectively establishing series circuits through the switch means and drive lines for the application of bipolar read and write currents to the drive lines to enter binary data into and to read binary data from the cores;

the combination with the switch means and the drive lines of a first pair of pulse transformers, each including a primary and a secondary winding, a direct current supply connected only to the primary winding of each transformer, the secondary windings connected to opposite ends of the series circuits formed by the switch means and the row drive lines and constituting the sole source of energizing current for said row drive lines; and a second pair of pulse transformers, each having a primary and a secondary winding, said direct current supply connected only to the primary windings of each of the latter transformers, the secondary windings of the latter transformers connected to opposite ends of the series circuits formed by the switch means and the column drive lines and constituting the sole source of energizing current for said column drive lines.

7. The combination set forth in claim 6 wherein the electronic switch means includes a plurality of transistor switches connected to respective drive lines, each switch comprising a transistor including base and emitter electrodes; and an input transformer including a secondary winding connected across the base and emitter electrodes and providing the sole source of base-emitter energizing current.

8. The combination set forth in claim 6 wherein the electronic switch means includes a plurality of transistor switches connected to respective drive lines, each switch comprising a transistor including base, collector and emitter electrodes;

an input transformer including a secondary winding, connected across the base and emitter electrodes and providing the sole source of base-emitter energizing current, and including an additional secondary winding; and a diode and said additional winding being connected in series across the emitter and collector electrodes and effective to prevent operation of the transistor in saturation.

9. The combination set forth in claim 6 wherein the electronic switch means is energized to establish series circuits for the selected drive lines, and in which said first and second pairs of transformers are energized to initiate alternatively the read or write currents in the selected drive lines subsequent to the energization of the switch means and are de-energized prior to the de-energization of the switch means.

10. The combination set forth in claim 7 wherein the electronic switch means is energized to establish series circuits for the selected drive lines, and in which said first and second pairs of transformers are energized to initiate alternatively the read or write currents in the selected drive lines subsequent to the energization of the switch means and are de-energized prior to the de-energization of the switch means.

11. In a magnetic core array of the type in which bistable cores are arranged in a plurality of spaced planes, the cores in each plane being further arranged in rows and columns;

in which means including row and column drive lines, threaded through respective rows and columns of cores, and means including at least one additional line, threaded through the cores of each plane, selectively address the cores; and in which means including electronic switch means are operated for selectively establishing series circuits through the switch means and drive lines for the application of bipolar read and write currents to the drive lines to enter binary data into and to read binary data from the cores;

the combination with the switch means and the drive lines of a first pair of pulse transformers, each including a primary and a secondary winding, a direct current supply connected only to the primary winding of each transformer, the secondary windings connected to opposite ends of the series circuits formed by the switch means and the row drive lines and constituting the sole source of energizing current for said row drive lines; and a second pair of pulse transformers, each having a primary and a secondary winding, said direct current supply connected only to the primary windings of the latter transformers, the secondary windings of the latter transformers connected to opposite ends of the series circuits formed by the switch means and the column drive lines and constituting the sole source of energizing current for said column drive lines.

12. The combination set forth in claim 11 wherein the electronic switch means includes a plurality of transistor switches connected to respective drive lines, each switch comprising a transistor including base and emitter electrodes; and an input transformer including a secondary winding connected across the base and emitter electrodes and providing the sole source of base-emitter energizing current.

13. The combination set forth in claim 11 wherein the electronic switch means includes a plurality of transistor switches connected to respective drive lines, each switch comprising a transistor switch including base, collector and emitter electrodes;

an input transformer including a secondary winding, connected across the base and emitter electrodes and providing the sole source of base-emitter energizing current, and including an additional secondary winding;

a diode and said additional winding being connected in series across the emitter and collector electrodes and effective to prevent operation of the transistor in saturation.

14. The combination set forth in claim 11 wherein the electronic switch means is energized to establish selected series circuits for the selected drive lines, and in which said first and second pairs of transformers are energized to initiate alternatively the read or write currents in the selected drive lines subsequent to the energization of the switch means and are de-energized prior to the de-energization of the switch means.

15. The combination set forth in claim 12 wherein the electronic switch means is energized to establish selected series circuits for the selected drive lines, and in which said first and second pairs of transformers are energized to initiate alternatively the read or write currents in the selected drive lines subsequent to the energization of the switch means and are de-energized prior to the de-energization of the switch means.

References Cited

UNITED STATES PATENTS

| | | | |
|---|---|---|---|
| 3,289,008 | 11/1966 | Sommerfield | 307—218 |
| 3,343,147 | 9/1967 | Ashwell | 340—174 |

BERNARD KONICK, *Primary Examiner.*

G. M. HOFFMAN, *Assistant Examiner.*

U.S. Cl. X.R.

307—253. 270